(12) United States Patent
Riccardi et al.

(10) Patent No.: US 10,733,402 B2
(45) Date of Patent: Aug. 4, 2020

(54) SYSTEM FOR VEHICLE IDENTIFICATION

(71) Applicant: 3M INNOVATIVE PROPERTIES COMPANY, St. Paul, MN (US)

(72) Inventors: John L. Riccardi, Lake Elmo, MN (US); Andrew D. Dubner, Saint Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/235,162

(22) Filed: Dec. 28, 2018

(65) Prior Publication Data

US 2019/0318138 A1 Oct. 17, 2019

Related U.S. Application Data

(60) Provisional application No. 62/656,189, filed on Apr. 11, 2018.

(51) Int. Cl.
| | | |
|---|---|---|
| *G06K 7/10* | (2006.01) | |
| *H04N 5/33* | (2006.01) | |
| *G06K 19/06* | (2006.01) | |
| *G06K 7/14* | (2006.01) | |
| *B60Q 1/00* | (2006.01) | |

(52) U.S. Cl.
CPC ....... *G06K 7/10722* (2013.01); *G06K 7/1408* (2013.01); *G06K 19/06009* (2013.01); *H04N 5/33* (2013.01); *B60Q 1/0017* (2013.01); *B60Y 2400/3015* (2013.01)

(58) Field of Classification Search
CPC ......... G06K 7/10722; G06K 19/06009; G06K 7/1408; H04N 5/33; B60Q 1/0017; B60Y 2400/3015
See application file for complete search history.

(56) References Cited

U.S. PATENT DOCUMENTS

| | | | |
|---|---|---|---|
| 5,983,157 A | 11/1999 | Sugitani | |
| 6,024,455 A | 2/2000 | O'Neill | |
| 6,650,765 B1 * | 11/2003 | Alves | G08G 1/0175 340/933 |
| 7,387,393 B2 | 6/2008 | Reich | |
| 8,113,434 B2 | 2/2012 | Thomas, III | |
| 9,002,066 B2 | 4/2015 | Kozitsky | |
| 9,041,554 B2 | 5/2015 | Serex | |

(Continued)

FOREIGN PATENT DOCUMENTS

| | | |
|---|---|---|
| DE | 102015011869 | 3/2017 |
| FR | 2888535 | 7/2008 |

(Continued)

*Primary Examiner* — Seung H Lee
(74) *Attorney, Agent, or Firm* — 3M Innovative Properties Company; Carlos M. Téllez

(57) ABSTRACT

The sensors on a vehicle can have difficulties identifying surrounding objects in the environment. Markers with predetermined properties that match with reading capabilities of the on-vehicle sensors would provide information about the surrounding environment. In particular, adjacent vehicles may have markers with predetermined properties that match with reading capabilities of the vehicle sensors. The sensors would obtain information about the surrounding vehicles on the road, which could be used to provide context for decision making of the advanced driver assistance system.

17 Claims, 5 Drawing Sheets

(56) References Cited

U.S. PATENT DOCUMENTS

| | | | |
|---|---|---|---|
| 9,062,979 B1 | 6/2015 | Ferguson | |
| 9,104,933 B2 | 8/2015 | Venkatesha | |
| 9,221,481 B2 | 12/2015 | Desbordes | |
| 9,255,805 B1 | 2/2016 | Ferguson | |
| 9,905,131 B2* | 2/2018 | Lai | G08G 1/164 |
| 9,910,194 B2 | 3/2018 | Free | |
| 10,207,411 B2* | 2/2019 | Michalakis | H04N 5/332 |
| 10,417,534 B2* | 9/2019 | Smithson | G02B 5/26 |
| 2002/0080013 A1* | 6/2002 | Anderson, III | G07C 5/008 |
| | | | 340/425.5 |
| 2003/0090799 A1 | 5/2003 | Hsu | |
| 2005/0213109 A1 | 9/2005 | Schell | |
| 2007/0046779 A1* | 3/2007 | Sourlier | G07C 5/085 |
| | | | 348/148 |
| 2009/0174777 A1 | 7/2009 | Smith | |
| 2010/0151213 A1 | 6/2010 | Smithson | |
| 2011/0042462 A1 | 2/2011 | Smith | |
| 2011/0167689 A1 | 7/2011 | Ford | |
| 2012/0114181 A1 | 5/2012 | Borthwick | |
| 2014/0376778 A1* | 12/2014 | Muetzel | G06K 9/3258 |
| | | | 382/105 |
| 2015/0019098 A1 | 1/2015 | Schrabler | |
| 2017/0147991 A1* | 5/2017 | Franke | G06Q 10/20 |
| 2018/0111554 A1* | 4/2018 | Pearce | H04N 5/247 |

FOREIGN PATENT DOCUMENTS

| | | |
|---|---|---|
| WO | WO 2004-081619 | 9/2004 |
| WO | WO 2013-149142 | 10/2013 |
| WO | WO 2017-127734 | 7/2017 |
| WO | WO 2017-176758 | 10/2017 |
| WO | WO 2018-064198 | 4/2018 |
| WO | WO 2018-064203 | 4/2018 |
| WO | WO 2018-064212 | 4/2018 |
| WO | WO 2018-072176 | 4/2018 |
| WO | WO 2018-129076 | 7/2018 |

* cited by examiner

SYSTEM FOR VEHICLE IDENTIFICATION

CROSS REFERENCE TO RELATED APPLICATIONS

This application claims priority from U.S. Provisional Application Ser. No. 62/656,189, filed Apr. 11, 2018, the disclosure of which is incorporated by reference in its entirety herein.

TECHNICAL FIELD

The present disclosure relates to a system for vehicle identification.

BACKGROUND

Many vehicles have camera and sensors for monitoring the surrounding environment and provide information to an advanced driver assistance system. An advanced driver assistance system can provide safety enhancements to a vehicle, such as lane departure warning. For autonomous vehicles, the advanced driver assistance system controls the movement of the vehicle. Having reliable and clear information for the on-vehicle camera and sensors can provide better environmental context for the advanced driver assistance system, and therefore higher confidence in the decisions of the advanced driver assistance system.

SUMMARY

The cameras and sensors on a vehicle can have difficulties identifying surrounding objects in the environment. Markers with predetermined properties that match with reading capabilities of the on-vehicle cameras and sensors would provide information about the surrounding environment, which could be used to provide context for decision making of the advanced driver assistance system. In particular, vehicles may have the markers with predetermined properties that match with reading capabilities of the cameras and sensors of the vehicle. The camera and sensors would obtain information about the surrounding vehicles on the road, which could be used to provide context for decision making of the advanced driver assistance system.

In one embodiment, a system for identifying a first vehicle comprises a set of optically active markers, each optically active marker on at least a portion of opposing outward surfaces of the first vehicle and each optically active marker comprises machine-readable information, an image capture device on a second vehicle that detects and produces an image of at least one of the optically active markers, a processor that processes the image to find the machine-readable information and associates the machine-readable information with information of the first vehicle.

In one embodiment, a first vehicle with identifying optically active markers comprises a set of optically active markers, each optically active marker on at least a portion of opposing outward surfaces of the first vehicle, wherein each optically active marker comprises machine-readable information and is either visibly transparent or a color corresponding to the outward surface of the first vehicle to which it is attached.

In one embodiment, a set of identifying optically active markers comprises a set of optically active markers, each optically active marker comprising adhesive for adhesive placement on at least a portion of opposing outward surfaces of the first vehicle, wherein each optically active marker comprises machine-readable information and is either visibly transparent or a color corresponding to the outward surface of the first vehicle to which it is attached.

In one embodiment, a system for issuing optically active markers comprises receiving information regarding a first vehicle, creating a set of optically active markers associated with information regarding the first vehicle and wherein each optically active marker comprises machine-readable information, issuing the optically active markers to the possessor of the first vehicle, instructing the possessor of the vehicle to secure each optically active marker on at least a portion of opposing outward facing front, read, and side surfaces of the first vehicle.

In one embodiment, the optically active markers are on opposing outward surfaces of the first vehicle at approximately 90 degrees from one another. In one embodiment, the set of optically active markers comprises a first optically active marker on a first outward facing surface of the first vehicle, a second optically active marker on a second outward facing surface of the first vehicle, opposite from the first outward facing surface of the first vehicle, a third optically active marker on a third outward facing surface of the first vehicle, a fourth optically active marker on a fourth outward facing surface of the first vehicle, opposite from the third outward facing surface of the first vehicle. In one embodiment, at least one optically active marker is on a headlamp or taillamp of the first vehicle. In one embodiment, at least one optically active marker is a number plate of the first vehicle. In one embodiment, at least one optically active marker is on at least a portion of a window of the first vehicle. In one embodiment, there is an additional optically active marker on the first vehicle.

In one embodiment, the additional optically active marker is on a side mirror of the first vehicle. In one embodiment, the additional optically active marker is on any one of the outward facing surface of the first vehicle.

In one embodiment, at least one optically active marker is retroreflective. In one embodiment, at least one optically active marker is a wavelength selective material and wherein the image capture device responds to the wavelength selective optically active marker. In one embodiment, at least one optically active marker is infrared selective and the image capture device is an infrared camera. In one embodiment, at least one optically active marker is infrared absorbing, scattering, or reflecting and the image capture device is an infrared camera. In one embodiment, at least one optically active marker comprises a retroreflective layer and at least a portion comprising an infrared selective layer. In one embodiment, at least one optically active marker returns polarized light and the image capture device responds to polarized light. In one embodiment, the optically active markers are visibly transparent or a color corresponding to the outward surface of the vehicle to which it is attached.

In one embodiment, instructions indicate the location on the outward facing surface of the first vehicle for each optically active marker. In one embodiment, the information regarding the first vehicle include exterior color information, and wherein the optically active markers for attachment to outward facing surfaces of the first vehicle correspond in color to the exterior color information.

In one embodiment, the machine-readable information comprises a code wherein the processor associates machine-readable information of the code with code information. In one embodiment, the processor accesses a database and associate machine-readable information of the code with code information. In one embodiment, each optically active marker comprises the same machine-readable information.

In one embodiment, each optically active marker comprises different machine-readable information. In one embodiment, information about the first vehicle comprises any one of vehicle type, vehicle color, vehicle owner, unique vehicle identification information, vehicle placement. In one embodiment, the machine-readable information causes the second vehicle to respond.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Techniques of the disclosure are directed to identifying optically active markers on a first vehicle, to provide information to a second vehicle with a matching image capture device for seeing the optically active marker. Rather than an on-vehicle sensor simply scanning the environment to identify objects that present a safety threat, the optically active markers identified by the image capture device provide information to the second vehicle about the first vehicle. In this way, the second vehicle has higher confidence in identifying adjacent vehicles.

Figure 1:
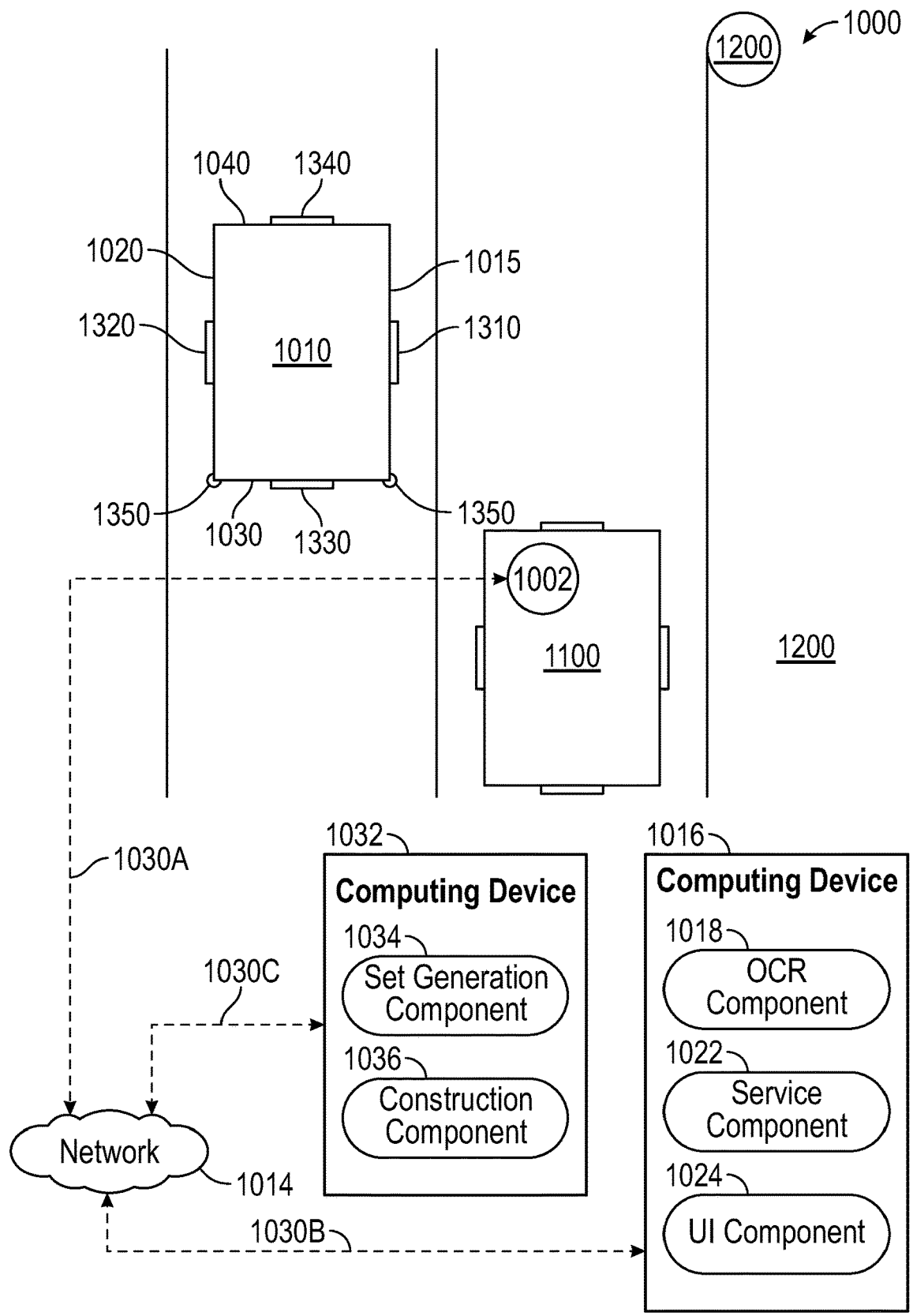
FIG. 1 is a block diagram illustrating one embodiment of a vehicle identification system 1000 for identifying optically active markers.

FIG. 1 is a block diagram illustrating an example system 1000 for identifying optically active markers 1300 on a first vehicle 1010 in accordance with techniques of this disclosure. As shown in FIG. 1, system 1000 includes an image capture device 1002 located on a first vehicle 1010. In some embodiments there may also be an image capture device 1002 located on fixed infrastructure 1200. If an image capture device 1002 is located on fixed infrastructure 1200, it is understood it would also be connected to a computing device, processor, etc. Image capture device 1002 may include one or more image capture sensors 1006 and one or more light sources 1004. System 1010 may also include one or more optically active articles 1300 as described in this disclosure. Optically active marker 1300 are attached to opposing outward facing surface of the first vehicle 1010. In some examples, image capture device 1002 is communicatively coupled to computing device 1002 via network 1002 using one or more communication links. In other examples, as described in this disclosure, image capture device 1002 may be communicatively coupled to computing device 1002 via one or more forms of direct communication without network 1002, such as via a wired or wireless connection that does not require a network.

For example purposes in FIG. 1, the first vehicle 1010 contains a set of optically active markers 1300 (shown as an optically active marker set 1310, 1320, 1330, 1340) that can be viewed by second vehicle 1100, which contains image capture device 1002. It is understood that ideally as many vehicles as possible contain optically active markers 1300 as described to be "seen" by adjacent vehicles with image capture devices. Also, it is ideal that as many vehicles as possible contain image capture devices to "see" adjacent vehicles with optically active markers 1300. Any single vehicle may contain both optically active markers 1300 and an image capture device 1002. Vehicle may be an automobile, motorcycle, airplane, water vessel, military equipment, bicycle, train, or any other transportation vehicle.

For example purposes in FIG. 1, optically active marker 1300 comprise a first optically active marker 1310, second optically active marker 1320, third optically active marker 1330, and a fourth optically active marker 1340 are each attached to opposing outward facing surface of the first vehicle 1010. Placement of the optically active markers 1300 in all opposing outward facing surfaces of the first vehicle 1010 maximizes the ability of an image capture device 1002 to see the first vehicle 1010 from any direction (e.g., front, rear, left, and right side).

For example, first optically active marker 1310 is on a first outward surface 1015 of the first vehicle 1010 and second optically active marker 1320 is on a second outward surface 1020 of the first vehicle 1010. The first outward surface 1015 is generally opposite from the second outward surface 1020. In FIG. 1, the first outward surface 1015 is facing 180 degrees away from the second outward surface 1020. For example, third optically active marker 1330 is on a third outward surface 1030 of the first vehicle 1010 and fourth optically active marker 1340 is on a fourth outward surface 1040 of the first vehicle 1010. The third outward surface 1030 is generally opposite from the fourth outward surface 1040. In FIG. 1, the third outward surface 1030 is facing 180 degrees away from the fourth outward surface 1040. Therefore, in total, the optically active marker 1300 in FIG. 1 are on four opposing surface of the vehicle 1010, opposed approximately 90 degrees from each other. It is understood that a vehicle is not perfectly rectangular and so placement of the set of optically active markers 1300 may not be able to be offset by 90 degrees. Ideally, there is an optically active marker on at least the front and rear of the vehicles and each opposing side surface. Any of the first, second, third, or fourth optically active markers 1310, 1320, 1330, 1340 can be placed at the corners of the first vehicle 1010.

Depending on the size of the vehicle, additional optically active markers 1300 may be placed on the vehicle to increase the detectability of the vehicle 1010. For example, more than one optically active marker 1300 may be included on each of the first, second, third, and fourth outward facing surfaces 1310, 1320, 1330, 1340 of the first vehicle 1010. An additional optically active marker may be placed on the top, on the wheels, or at the corners of the vehicle where outward facing surfaces meet.

In one embodiment, the optically active markers 1300 may be integrally incorporated into the construction of the first vehicle 1010. In other embodiments, the optically active markers 1300 are applied to a first vehicle 1010 after the vehicle is manufactured. For example, the optically active markers 1300 maybe be a sticker applied to the first vehicle 1010. In some embodiments, if the license plate of the vehicle is optically active (e.g., retroreflective) it can serve as the third and fourth optically active markers 1330, 1340.

In one embodiment, a transportation or vehicle authority, such as a department of transportation or department of vehicle registration could require placement of optically active markers 1300 on outward facing surface of a first vehicle 1010. When issuing optically active markers 1300, each optically active marker 1300 should associate with a predetermined outward facing surface of the first vehicle 1010 so that the optically active marker 1300 is not visibly conspicuous. In one embodiment, the optically active marker is visibly transparent or of a color that corresponds to the underlying outward facing surface of the first vehicle 1010. For example, a vehicle registration manager may first receive information regarding a first vehicle 1010, such as the vehicle type and color, then the vehicle registration manager will create a set of optically active markers 1300, like shown in FIG. 7, associated with information regarding the first vehicle 1010 and will issue the optically active markers 1300 to the possessor of the first vehicle 1010. Instructions can be provided to the possessor of the first vehicle 1010 to secure each optically active marker on at least a portion of opposing outward facing front, rear, and side surfaces of the first vehicle 1010.

In one embodiment, the optically active marker 1300 are inconspicuous to the human viewer, but readable by the image capture device 1002. For example, the optically active marker 1300 should respond to incoming light in a way that can be discernable by the image capture device 1002. For example, an optically active marker 1300 that is a retroreflective material to return incoming light (i.e., visible light, IR light, polarized light) back to the image capture device. For example, an optically active marker 1300 that is a wavelength selective absorber (i.e., IR absorbing ink) where the image capture device is a IR camera. For example, an optically active marker 1300 that is a wavelength selective reflector (i.e., IR reflecting film) where the image capture device is an IR camera.

Figure 3:
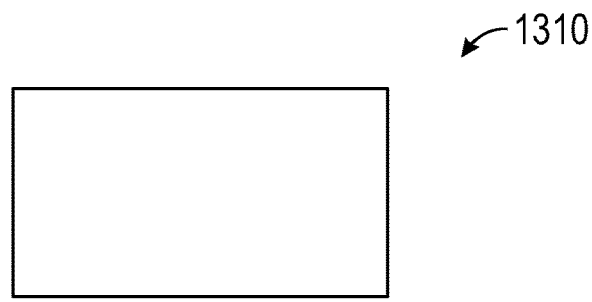
FIG. 3 shows a front view of one embodiment of an optically active marker for a vehicle identification system.

FIG. 3 depicts a front view of an embodiment of first optically active marker 1310. In this image the first optically active marker 1310 is either transparent or a matching color to the underlying outward facing surface of the first vehicle 1010. The optically active marker 1300 can be applied to any surface of the vehicle 1010. For example, the optically active marker 1300 could be applied to the painted body, a metal trim, a plastic molding, a rearview mirror, or to a window. The optically active marker 1300 should be transparent in the visible light spectrum or be a color corresponding to the surrounding outward facing surface of the first vehicle 1010.

The optically active marker 1310 includes a wavelength responsive layer 1350 that is able to be perceived by the image capture device 1002. For example, in one embodiment the optically active marker 1310, such as shown in FIG. 3, is a retroreflective material. Common retroreflective materials use either glass beads or prismatic elements to direct light back towards the source. For example, PCT Publication WO 2004/81619 and U.S. Pat. No. 9,910,194, the disclosures of which are herein incorporated by reference, disclose retroreflective sheeting. If the optically active marker 1310 is a retroreflective material, then the retroreflective material can be colored to match the underlying outward facing surface of the vehicle.

In one embodiment, the wavelength responsive layer of the optically active marker 1310 comprises a wavelength absorbent ink covering some or all of the optically active marker 1310. For example, 3M™ Sun Control Window Film is an multilayer optical film that is visibly transparent and reflects infrared light.

In some embodiment, the entire optically active marker 1300 comprises the wavelength responsive layer. Therefore, for example, for the optically active marker 1310 shown in FIG. 3, the image capture device 1002 will identify a rectangle. This may be sufficient information to the image capture device 1002 to identify the first vehicle 1010.

Figure 4:
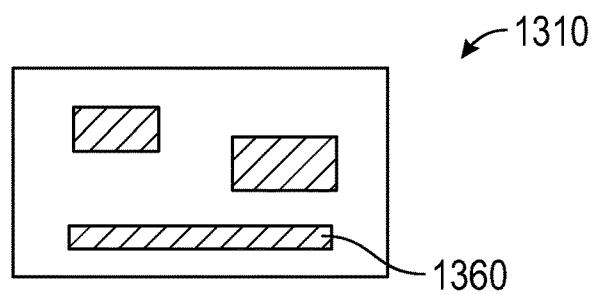
FIG. 4 shows a front view of an embodiment of an optically active marker with machine readable information that is a code.

In one embodiment, such as shown in FIG. 4, the optically active marker 1310 comprises a wavelength responsive layer 1350 arranged into a pattern, such as to form a code 1360. In this embodiment, the image capture device 1003 will perceive the code 1360 to identify the presence of the first vehicle 1010, but also could decode the code to obtain additional information. The code 1360 may be a unique identifier relating to the first vehicle 1010.

Figure 5:
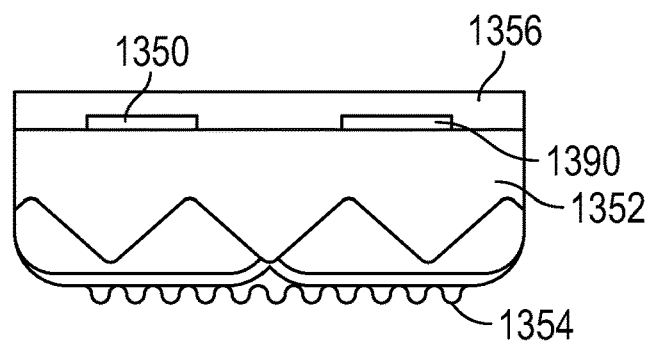
FIG. 5 shows a side sectional view of one embodiment of an optically active marker for a vehicle identification system.

FIG. 5 is an exemplary side sectional view of an optically active marker 1310 that comprises a retroreflective material 1352 and overlying portions of the retroreflective material 1352 is a wavelength responsive layer 1350, such as an infrared reflecting layer arranged to form a code 1360, like shown in FIG. 4. Overlying the wavelength responsive layer 1350 is a protective film 1356. Underlying the optically active marker 1310 is an adhesive layer 1354, for securing the optically active marker 1310 to the first outward facing surface 1015 of the first vehicle 1010.

Figure 6:
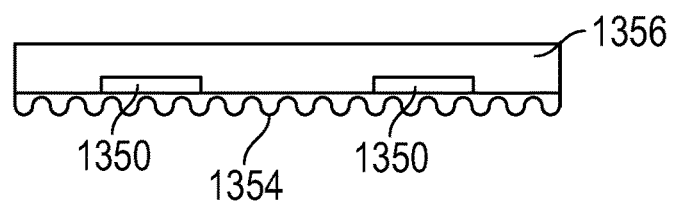
FIG. 6 shows a side sectional view of another embodiment of an optically active marker for a vehicle identification system.

FIG. 6 is an exemplary side sectional view of an optically active marker 1310 that comprises a wavelength selective layer 1350, such as an infrared reflecting layer arranged to form a code 1360, like shown in FIG. 4. Overlying the wavelength responsive layer 1350 is a protective film 1356. Underlying the optically active marker 1310 is an adhesive layer 1354, for securing the optically active marker 1310 to the first outward facing surface 1015 of the first vehicle 1010.

Although typically the optically active marker 1300 will include an adhesive surface 1354 such as shown in FIGS. 5 and 6, the optically active marker 1300 may be applied to the outward facing surface of the vehicle using one or more techniques and/or materials including but not limited to: mechanical bonding, thermal bonding, chemical bonding, or any other suitable technique for attaching sheeting to a vehicle surface.

Figure 7:
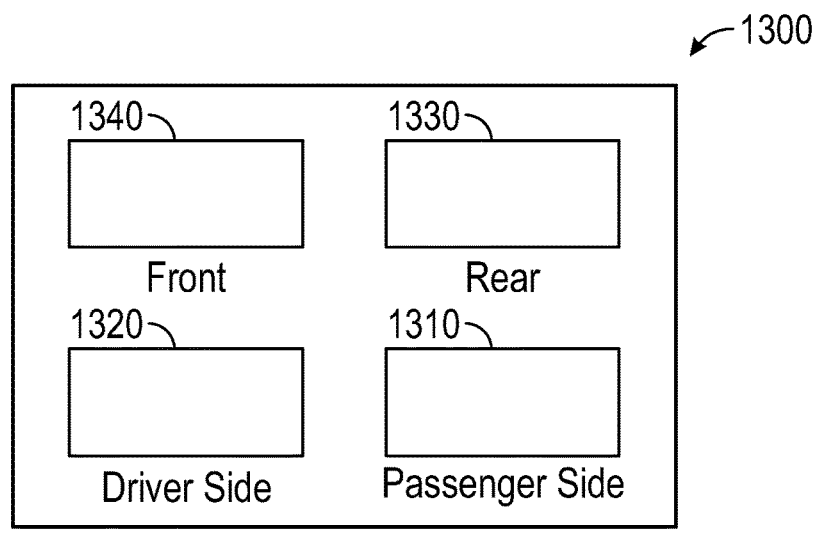
FIG. 7 shows a set of optically active markers for a vehicle identification system.

The set of optically active markers 1300 for the first vehicle 1010 may be compiled together and distributed for application to the first vehicle 1010. The set of optically active markers 1300 may have unique information embedded in a code in one or more of the optically active markers 1300. The distributed set of optically active markers 1300 may include customized coloring and instructions for identifying the placement on to the first vehicle 1010. For example, FIG. 7 shows a set of optically active markers 1300 comprising the first optically active marker 1310, the second optically active marker 1320, the third optically active marker 1330, and the fourth optically active marker 1340 all secured to a single sheet that is distributed for defined application to the first vehicle 1010.

Figure 8:
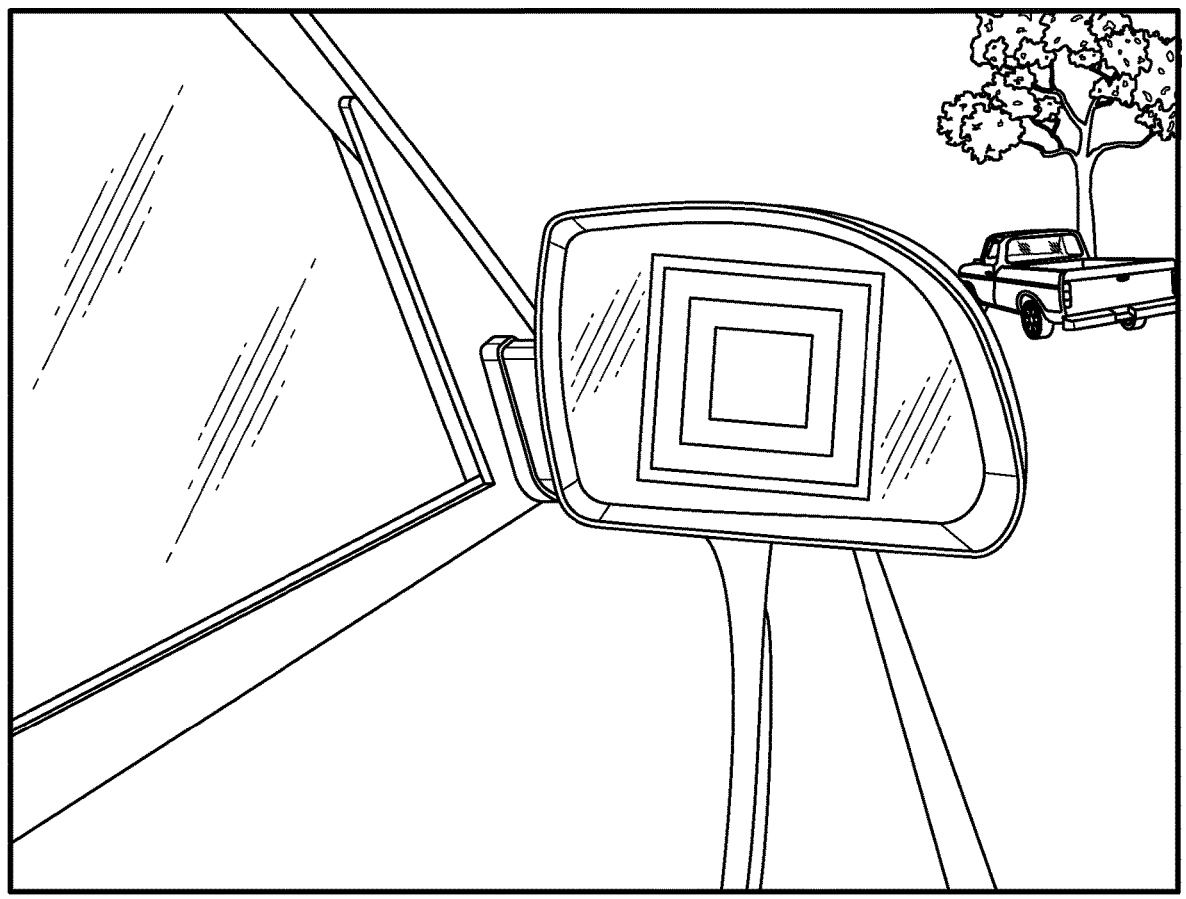
FIG. 8 shows machine readable information of an additional optically active marker at a vehicles side mirror.

An additional optically active marker 1350 may be placed on one or more of the first vehicle's side mirrors 1050 such as shown in FIG. 8. Image capture device 1002 of the second vehicle 1100 can identify the location of these outward extending mirrors on the first vehicle 1010. In this embodiment, the additional optically active marker 1350 is visibly transparent so it does not interfere with the driver's ability to use the functional mirror 1050. FIG. 8 shows the machine-readable information that is configured in a pattern to form a code. In one embodiment, a multilayer IR reflecting optical film that is visibly transparent is used. The image capture device 1002 of the second vehicle 1100 will perceive a black area at the mirror in the IR band. As described above, codes could be provided and alternative materials, like polarized film can be detected with polarized light. In another embodiment, a first optically active marker could be provided on a first side mirror and a second optically active marker could be provided on a second side mirror. In one embodiment, the first optically active marker includes circular polarized film with a first circular polarization handedness and the second optically active marker includes circular polarized film with a second circular polarization handedness.

Figure 9:
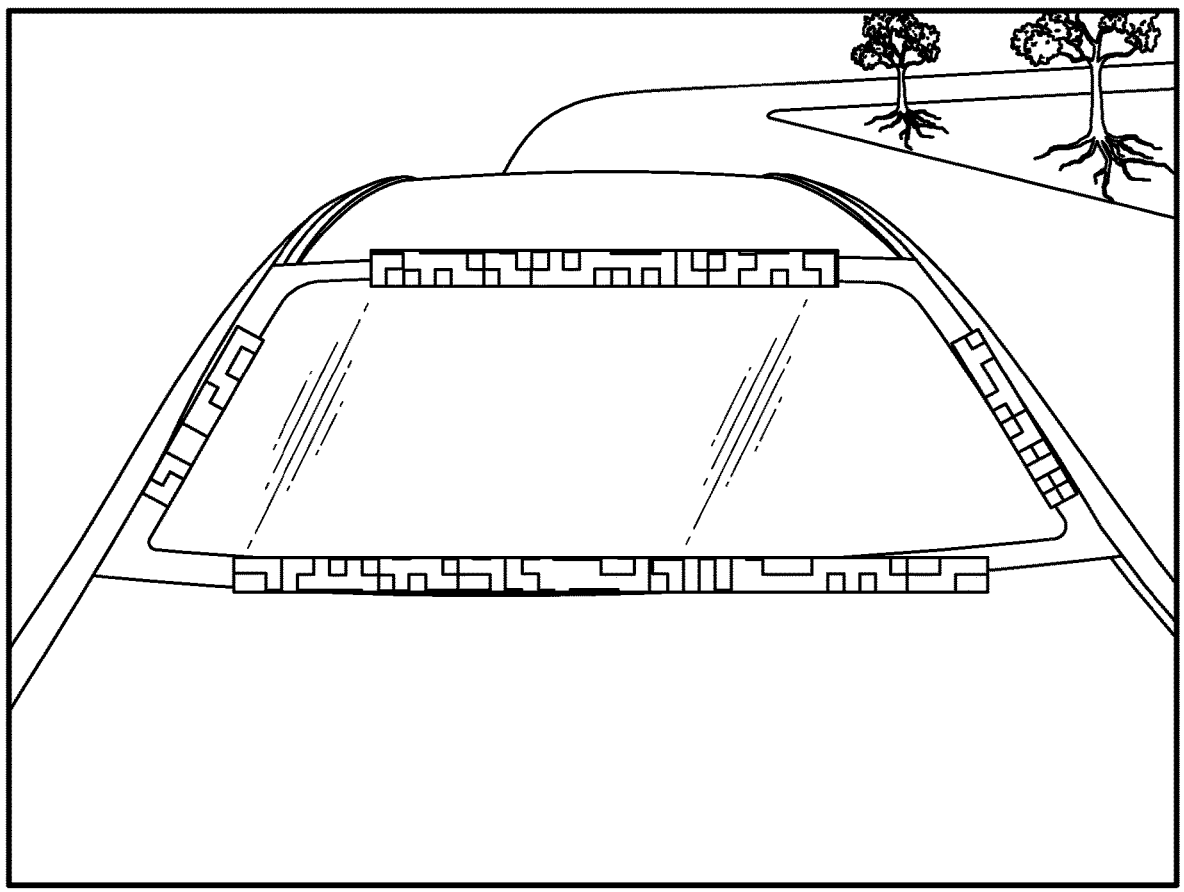
FIG. 9 shows an optically active marker placed in a window of a vehicle.

Any of the outward facing surfaces of the first vehicle 1010 may be one of the vehicle's windows 1060. FIG. 9 shows an embodiment where the optically active marker 1310 is provided in the front window 1060 of the first vehicle 1010. Specifically, the optically active marker 1310 is provided at the perimeter, or the frit 1065, of the window 1060. In this embodiment, the optically active article 1310 is visibly transparent so it does not interfere with the driver's ability to see through the window. In one embodiment, a multilayer IR reflecting optical film that is visibly transparent is used. The image capture device 1002 of the second vehicle 1100 will perceive a black area at the window perimeter in the IR band. As described above, codes could be provided and alternative materials, like polarized film can be detected by polarized light.

As shown in FIG. 1, system 1000 may include image capture device 1002. Image capture device 1002 may convert light or electromagnetic radiation sensed by image capture sensors 1006 into information, such as digital image or bitmap comprising a set of pixels. Each pixel may have chromiance and/or luminance components that represent the intensity and/or color of light or electromagnetic radiation. Image capture device 1002 may include one or more image capture sensors 1006 and one or more light sources 1004. In some examples, image capture device 1002 may include image capture sensors 1006 and light sources 1004 in a single integrated device, such as shown in FIG. 1. In other examples, image capture sensors 1006 or light sources 1004 may be separate from or otherwise not integrated in image capture device 1002. Examples of image capture sensors 1006 may include semiconductor charge-coupled devices (CCD) or active pixel sensors in complementary metal-oxide-semiconductor (CMOS) or N-type metal-oxide-semiconductor (NMOS, Live MOS) technologies. Digital sensors include flat panel detectors. In the example, image capture device 1002 includes at least two different sensors for detecting light in two different wavelength spectrums. In some examples, a first image capture and a second image capture sensor substantially concurrently detect first and second wavelengths. Substantially concurrently may refer to detecting the first and second wavelengths within 10 milliseconds of one another, within 50 milliseconds of one another, or within 1000 milliseconds of one another to name only a few examples.

In some examples, one or more light sources 1004 include a first source of radiation and a second source of radiation. In some examples, the first source of radiation emits radiation in the visible spectrum, and the second source of radiation emits radiation in the near infrared spectrum. In other examples, the first source of radiation and the second source of radiation emit radiation in the near infrared spectrum. As shown in FIG. 1 one or more light sources 1004 may emit radiation (e.g., infrared light 1027) in the near infrared spectrum.

In some examples, image capture device 1002 includes a first lens and a second lens. In some examples, image capture device 1002 captures frames at 50 frames per second (fps). Other exemplary frame capture rates include 60, 30 and 25 fps. It should be apparent to a skilled artisan that frame capture rates are dependent on application and different rates may be used, such as, for example, 1000 or 200 fps. Factors that affect required frame rate are, for example, application (e.g., parking vs. tolling), vertical field of view (e.g., lower frame rates can be used for larger fields of view, but depth of focus can be a problem), and vehicle speed (faster traffic requires a higher frame rate).

In some examples, image capture device 1002 includes at least two channels. The channels may be optical channels. The two optical channels may pass through one lens onto a single sensor. In some examples, image capture device 1002 includes at least one sensor, one lens and one band pass filter per channel. The band pass filter permits the transmission of multiple near infrared wavelengths to be received by the single sensor. The at least two channels may be differentiated by one of the following: (a) width of band (e.g., narrowband or wideband, wherein narrowband illumination may be any wavelength from the visible into the near infrared); (b) different wavelengths (e.g., narrowband processing at different wavelengths can be used to enhance features of interest, such as, for example, a license plate and its lettering (license plate identifier), while suppressing other features (e.g., other objects, sunlight, headlights); (c) wavelength region (e.g., broadband light in the visible spectrum and used with either color or monochrome sensors); (d) sensor type or characteristics; (e) time exposure; and (f) optical components (e.g., lensing).

In the example of FIG. 1, image capture device 1002 on second vehicle 1100 may capture one or more images of optically active article 1310, 1330 on vehicle 1010. In other examples, image capture device 1002 may be stationary on roadside infrastructure.

In the example of FIG. 1, image capture device 1002 may be communicatively coupled to computing device 112 by one or more communication links 1030A and 1030B. Image capture device 1002 may send images of optically active markers 1300 to computing device 1016. Communication links 1030A and 1030B may represent wired or wireless connections. For instance communication links 1030A and 1030B may be wireless Ethernet connections using a WiFi protocol and/or may be wired Ethernet connections using Category 5 or Category 6 cable. Any suitable communication links are possible. In some examples, image capture device 1002 is communicatively coupled to computing device 1016 by a network 1014. Network 1014 may represent any number of one or more network connected devices including by not limited to routers, switches, hubs, and interconnecting communication links that provide for forwarding of packet and/or frame-based data. For instance, network 1014 may represent the Internet, a service provider network, a customer network, or any other suitable network. In other examples, image capture device 1002 is communicatively coupled to computing device 1016 by a direct connection, such as Universal Serial Bus (USB) link.

Computing devices 1016 and 1032 represent any suitable computing systems, which may be remote from image capture device 1002, such as one or more desktop computers, laptop computers, mainframes, servers, cloud computing systems, etc. capable of sending and receiving information with image capture device 1002. In some examples, computing devices 1016 and 1032 implement techniques of this disclosure.

In the example of FIG. 1, if the optically active marker 1300 comprises a pattern forming a code 1360. In a construction such as shown in FIG. 5 or 6, the wavelength responsive layer 1350 is applied based on an application specification that may be provided by a human operator or generated by a machine. For example, an application specification may specify one or more locations for application of visibly-transparent, infrared-reflecting material. For instance, the application specification may specify one or more symbols from a symbol set, where a particular symbol includes one or more encoding regions.

In the example of FIG. 1, computing device 1016 includes an optical character recognition component 1018 (or "OCR module 1018), service component 1022 and user interface (UI) component 1024. Components 1018, 1022, and 1024 may perform operations described herein using software, hardware, firmware, or a mixture of both hardware, software, and firmware residing in and executing on computing device 1016 and/or at one or more other remote computing devices. In some examples, components 1018, 1022 may be implemented as hardware, software, and/or a combination of hardware and software. Computing device 1016 may execute components 1018, 1022 with one or more processors. Computing device 1016 may execute any of components 1018, 1022 as or within a virtual machine executing on underlying hardware. Components 1018, 1022 may be implemented in various ways. For example, any of components 1018, 1022 may be implemented as a downloadable or pre-installed application or "app." In another example, any of components 1018, 1022 may be implemented as part of an operating system of computing device 1016.

After optically active markers 1300 have been constructed, they may be attached to vehicle 1010. In the example of FIG. 1, first vehicle 1010 may be driving on a roadway and second vehicle 1100 containing an image capture device 1002 may approach first vehicle 1010. Image capture device 1002 may cause light source 1004 to project light, such as an infrared light 1027 in the direction of vehicle 1010. At substantially the same time as light source 1004 is projecting infrared light 1027, image capture device 1006 may capture one or more images of optically active article 1008, such as image 1009. Substantially the same time may be at the same time or within 10 milliseconds, 50, milliseconds, or 1000 milliseconds. Image 1009 may be a bitmap in which infrared reflecting materials appear as black pixels. In embodiments with retroreflective sheeting, light directed at the optically active marker 1300 that is returned to the image capture device 1003 will appear as white pixels. The resulting image 1009 may be stored as a bitmap, which image capture device 1002 sends to computing device 1016 via network 1014.

Service component 1022 may receive one or more values relating to the first vehicle 1010. Service component 1022 may be provide any number of services, by performing one or more operations. For instance, service component 1022 may provide a GPS location of first vehicle 1010, identifying information about the vehicle 1010, or speed, orientation, or position relative to the second vehicle 1100. A vehicle registration verification service may verify that vehicle registration is current, based on the value, by accessing a registration database. A security service may determine whether a particular license plate associated with the first vehicle 1010 is counterfeit based on the association between the license plate number and any information containing in the optically active markers 1300. Any other suitable services may also be provided by service component 1022.

Computing device 1000 may also include UI component 1006. UI component 1006 of computing device 1002 may receive indications of user input from input devices such as a touch screen, keyboard, mouse, camera, sensor or any other input device. UI component 1006 may transmit, as output to other modules and/or components, the indications of user input, such that other components may perform operations. UI component 1006 may act as an intermediary between various components and modules of computing device 1016 to process and send input detected by input devices to other components and modules, and generate output from other components and modules that may be presented at one or more output devices. For instance, UI component 1006 may generate one or more user interfaces for display. The user interfaces may correspond to services provided by one or more of service components 112. UI component 1006 may, in some examples, generate one or more alerts, reports, or other communications that are sent to one or more other computing devices. Such alerts may include but are not limited to: emails, text messages, lists, phone calls, or any other suitable communications.

Figure 2:
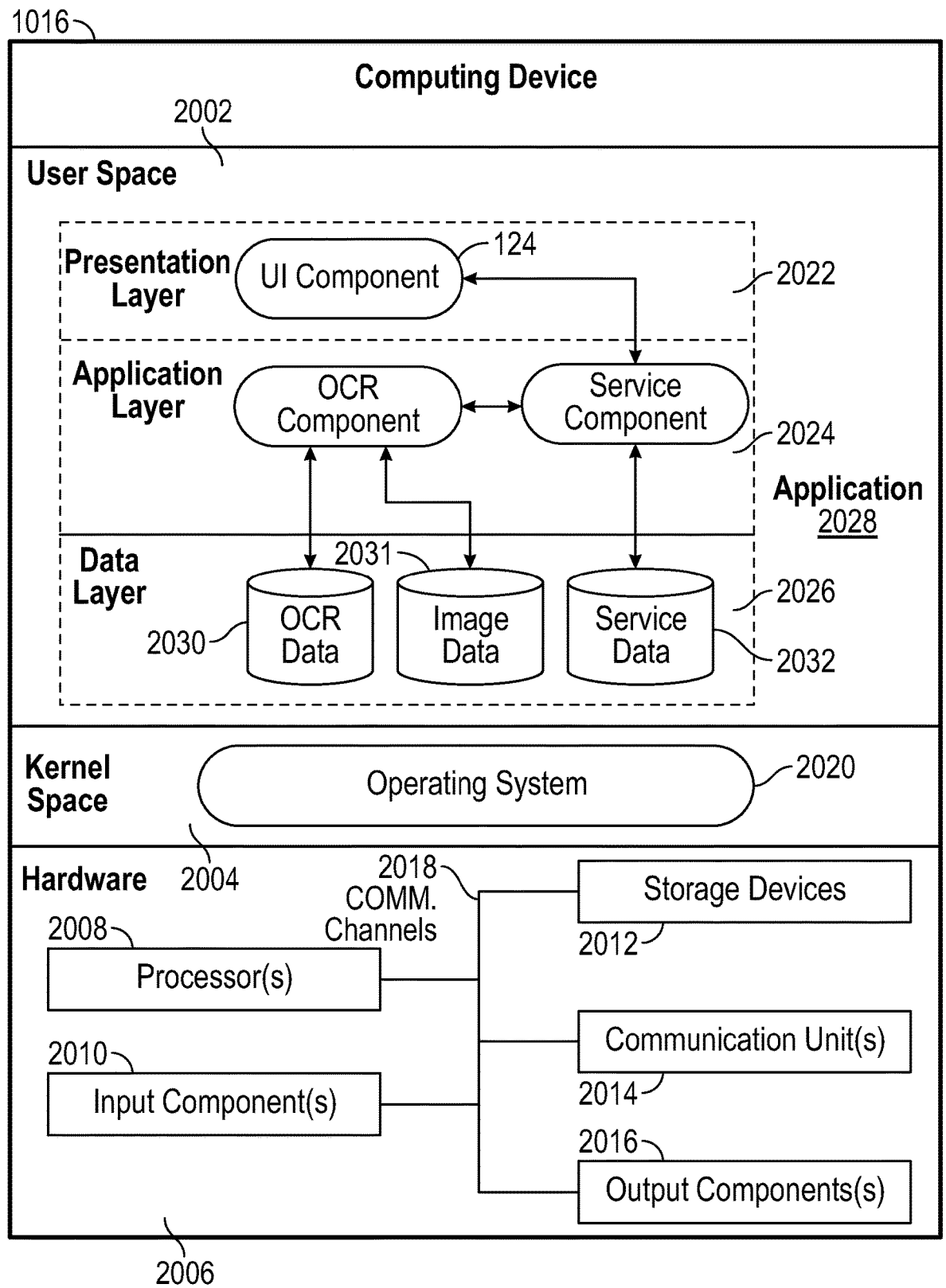
FIG. 2 is a block diagram illustrating an example computing device.

FIG. 2 is a block diagram illustrating an example computing device, in accordance with one or more aspects of the present disclosure. FIG. 2 illustrates only one particular example of computing device 1016, as shown in FIG. 1. Many other examples of computing device 1016 may be used in other instances and may include a subset of the components included in example computing device 1016 or may include additional components not shown example computing device 1016 in FIG. 2. In some examples, computing device 1016 may be a server, tablet computing device, smartphone, wrist- or head-worn computing device, laptop, desktop computing device, or any other computing device that may run a set, subset, or superset of functionality included in application 2028.

As shown in the example of FIG. 2, computing device 1016 may be logically divided into user space 2002, kernel space 2004, and hardware 2006. Hardware 2006 may include one or more hardware components that provide an operating environment for components executing in user space 2002 and kernel space 2004. User space 2002 and kernel space 2004 may represent different sections or segmentations of memory, where kernel space 2004 provides higher privileges to processes and threads than user space 2002. For instance, kernel space 2004 may include operating system 2020, which operates with higher privileges than components executing in user space 2002.

As shown in FIG. 2, hardware 2006 includes one or more processors 2008, input components 2010, storage devices 2012, communication units 2014, and output components 2016. Processors 2008, input components 2010, storage devices 2012, communication units 2014, and output components 2016 may each be interconnected by one or more communication channels 2018. Communication channels 2018 may interconnect each of the components 2008, 2010, 2012, 2014, and 2016 for inter-component communications (physically, communicatively, and/or operatively). In some examples, communication channels 2018 may include a hardware bus, a network connection, one or more inter-process communication data structures, or any other components for communicating data between hardware and/or software.

One or more processors 2008 may implement functionality and/or execute instructions within computing device 1016. For example, processors 2008 on computing device 1016 may receive and execute instructions stored by storage devices 2012 that provide the functionality of components included in kernel space 2004 and user space 2002. These instructions executed by processors 2008 may cause computing device 1016 to store and/or modify information, within storage devices 2012 during program execution. Processors 2008 may execute instructions of components in kernel space 2004 and user space 2002 to perform one or more operations in accordance with techniques of this disclosure. That is, components included in user space 2002 and kernel space 2004 may be operable by processors 2008 to perform various functions described herein.

One or more input components 242 of computing device 1016 may receive input. Examples of input are tactile, audio, kinetic, and optical input, to name only a few examples. Input components 242 of computing device 1016, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 2016 of computing device 1016 may generate output. Examples of output are tactile, audio, and video output. Output components 2016 of computing device 1016, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output. Output components 2016 may be integrated with computing device 1016 in some examples. In other examples, output components 2016 may be physically external to and separate from computing device 1016, but may be operably coupled to computing device 1016 via wired or wireless communication. An output component may be a built-in component of computing device 1016 located within and physically connected to the external packaging of computing device 1016 (e.g., a screen on a mobile phone). In another example, an output component may be an external component of computing device 1016 located outside and physically separated from the packaging of computing device 1016 (e.g., a monitor, a projector, etc. that shares a wired and/or wireless data path with a tablet computer).

One or more communication units 2014 of computing device 1016 may communicate with external devices by transmitting and/or receiving data. For example, computing device 1016 may use communication units 2014 to transmit and/or receive radio signals on a radio network such as a cellular radio network. In some examples, communication units 2014 may transmit and/or receive satellite signals on a satellite network such as a Global Positioning System (GPS) network. Examples of communication units 2014 include a network interface card (e.g. such as an Ethernet card), an optical transceiver, a radio frequency transceiver, a GPS receiver, or any other type of device that can send and/or receive information. Other examples of communication units 2014 may include Bluetooth®, GPS, 3G, 4G, and Wi-Fi® radios found in mobile devices as well as Universal Serial Bus (USB) controllers and the like.

One or more storage devices 2012 within computing device 1016 may store information for processing during operation of computing device 1016. In some examples, storage device 2012 is a temporary memory, meaning that a primary purpose of storage device 2012 is not long-term storage. Storage devices 2012 on computing device 1016 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 2012, in some examples, also include one or more computer-readable storage media. Storage devices 2012 may be configured to store larger amounts of information than volatile memory. Storage devices 2012 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 2012 may store program instructions and/or data associated with components included in user space 2002 and/or kernel space 2004.

As shown in FIG. 2, application 2028 executes in user space 2002 of computing device 1016. Application 2028 may be logically divided into presentation layer 2022, application layer 2024, and data layer 2026. Presentation layer 2022 may include user interface (UI) component 2028, which generates and renders user interfaces of application 2028. Application 2028 may include, but is not limited to: UI component 1024, OCR component 1018, and one or more service components 1022. For instance, application layer 2024 may include OCR component 1018 and service component 1022. Presentation layer 2022 may include UI component 1024.

Data layer 2026 may include one or more datastores. A datastore may store data in structure or unstructured form. Example datastores may be any one or more of a relational database management system, online analytical processing database, table, or any other suitable structure for storing data. OCR datastore 2030 may include matrix matching data to perform pixel-by-pixel comparisons, such as stored glyphs. OCR datastore 2030 may include feature matching data to perform feature identification, such as glyph features of a set of corresponding symbols. Service data 2032 may include any data to provide and/or resulting from providing a service of service component 1022. For instance, service data may include vehicle location information, vehicle registration information, or any other information. Image data 2031 may include one or more images that are received from one or more image capture devices. In some examples, the images are bitmaps, Joint Photographic Experts Group images (JPEGs), Portable Network Graphics images (PNGs), or any other suitable graphics file formats.

In the example of FIG. 2, one or more of communication units 2014 may receive, from an image capture device, an image of one or more optically active markers 1300, that may include a code 1360. In some examples, UI component 1024 or any one or more components of application layer 2024 may receive the image of the optically active marker 1300 and store the image in image data 2031. At least one symbol of the set of one or more symbols represented in the image comprises a set of one or more encoding regions that are embedded with the symbol.

In response to receiving the image, OCR component 1018 may compare a first spatial appearance of the particular symbol to a second spatial appearance of another symbol of the symbol set, wherein the first spatial appearance and the second spatial appearance are based on a particular lighting condition. In the example of FIG. 2, the lighting condition may be an infrared lighting condition.

In some examples, computing device 1016 may receive multiple images of one or more optically active markers within a particular time duration. For instance, an image capture device may send multiple images to computing device 1016 that were each taken within a particular time duration. In some examples, the time duration may be 50 milliseconds, 500 milliseconds, 1 second or 5 seconds. In some examples, the time duration may be any value between 10 milliseconds and 10 seconds. OCR component 1018 may evaluate the values for each image and provide a value to service component 1022 that occurred most frequently or that was the most likely value.

Exemplary Embodiments

1. A system for identifying a first vehicle comprising:
a set of optically active markers, each optically active marker on at least a portion of opposing outward surfaces of the first vehicle and each optically active marker comprises machine-readable information;
a image capture device on a second vehicle that detects and produces an image of at least one of the optically active markers;
a processor that processes the image to find the machine-readable information and associates the machine-readable information with information of the first vehicle.

2. A first vehicle with identifying optically active markers comprising:
a set of optically active markers, each optically active marker on at least a portion of opposing outward surfaces of the first vehicle;
wherein each optically active marker comprises machine-readable information and is either visibly transparent or a color corresponding to the outward surface of the first vehicle to which it is attached.

3. A set of identifying optically active markers comprising:
a set of optically active markers, each optically active marker comprising adhesive for adhesive placement on at least a portion of opposing outward surfaces of the first vehicle;
wherein each optically active marker comprises machine-readable information and is either visibly transparent or a color corresponding to the outward surface of the first vehicle to which it is attached.

4. A system for issuing optically active markers comprising:
receiving information regarding a first vehicle;
creating a set of optically active markers associated with information regarding the first vehicle and wherein each optically active marker comprises machine-readable information;
issuing the optically active markers to the possessor of the first vehicle;
instructing the possessor of the vehicle to secure each optically active marker on at least a portion of opposing outward facing front, rear, and side surfaces of the first vehicle.

5. The system, vehicle or markers of any one of the preceding embodiments, wherein the optically active markers are on opposing outward surfaces of the first vehicle at approximately 90 degrees from one another.

6. The system, vehicle or markers of anyone of the preceding embodiments, wherein the set of optically active markers comprises:
a first optically active marker on a first outward facing surface of the first vehicle;
a second optically active marker on a second outward facing surface of the first vehicle, opposite from the first outward facing surface of the first vehicle;
a third optically active marker on a third outward facing surface of the first vehicle;
a fourth optically active marker on a fourth outward facing surface of the first vehicle, opposite from the third outward facing surface of the first vehicle.

7. The system, vehicle or markers of any one of the preceding embodiments, wherein at least one optically active marker is on a headlamp or taillamp of the first vehicle.

8. The system, vehicle or markers of any one of the preceding embodiments, wherein at least one optically active marker is a number plate of the first vehicle.

9. The system, vehicle or markers of any one of the preceding embodiments, wherein at least one optically active marker is on at least a portion of a window of the first vehicle.

10. The system, vehicle or markers of any one of the preceding embodiments, further comprising an additional optically active marker on the first vehicle.

11. The system, vehicle or markers of any one of the preceding embodiments, wherein the additional optically active marker is on a side mirror of the first vehicle.

12. The system, vehicle or markers of any one of the preceding embodiments, wherein the additional optically active marker is on any one of the outward facing surface of the first vehicle.

13. The system, vehicle or markers of anyone of the preceding embodiments, wherein at least one optically active marker is retroreflective.

14. The system, vehicle or markers of any one of the preceding embodiments, wherein at least one optically active marker is a wavelength selective material and wherein the image capture device responds to the wavelength selective optically active marker.

15. The system, vehicle or markers of any one of the preceding embodiments, wherein at least one optically active marker is infrared selective and the image capture device is an infrared camera.

16. The system, vehicle or markers of any one of the preceding embodiments, wherein at least one optically active marker is infrared absorbing, scattering, or reflecting and the image capture device is an infrared camera.

17. The system, vehicle or markers of any one of the preceding embodiments, wherein at least one optically active marker comprises a retroreflective layer and at least a portion comprising an infrared selective layer.

18. The system, vehicle or markers of any one of the preceding embodiments, wherein at least one optically active marker returns polarized light and the image capture device responds to polarized light.

19. The system, vehicle or markers of any one of preceding embodiments, wherein the optically active markers are visibly transparent or a color corresponding to the outward surface of the vehicle to which it is attached.

20. The system, vehicle or markers of any one of the preceding embodiments, instructions indicate the location on the outward facing surface of the first vehicle for each optically active marker.

21. The system, vehicle or markers of any one of the preceding embodiments, wherein the information regarding the first vehicle include exterior color information, and wherein the optically active markers for attachment to outward facing surfaces of the first vehicle correspond in color to the exterior color information.

22. The system, vehicle or markers of any one of the preceding embodiments, wherein the machine-readable information comprises a code wherein the processor associates machine-readable information of the code with code information.

23. The system, vehicle or markers of any one of the preceding embodiments, wherein the processor accesses a database and associate machine-readable information of the code with code information.

24. The system, vehicle or markers of any one of the preceding embodiments, wherein each optically active marker comprises the same machine-readable information.

25. The system, vehicle or markers of any one of the preceding embodiments, wherein each optically active marker comprises different machine-readable information.

26. The system, vehicle or markers of any one of the preceding embodiments, wherein information about the first vehicle comprises any one of vehicle type, vehicle color, vehicle owner, unique vehicle identification information, vehicle placement.

27. The system, vehicle or markers of any one of the preceding embodiments, wherein the machine-readable information causes the second vehicle to respond.

In some examples, the term "human-readable information" refers to information that can be read and comprehended by a human without further machine translation. Examples of human-readable information include, but are not limited to, alphanumeric characters, designs, geometric shapes, symbols, and Asian or Arabic language characters. In some examples, human-readable information does not include encoded information that is not comprehended by a human, without further translations of a machine, such as, for example, barcodes. In some examples, the human-readable information is made visible or invisible to an appropriate optical detector (e.g., human eye) under certain conditions.

In some examples, the term "machine-readable information" refers to information that is encoded in a form that can be optically imaged by a machine or computer and interpreted by its hardware and software, but not by a human. In some examples, the machine-readable information is made visible or invisible to an appropriate optical detector (e.g., camera) under certain conditions.

In the present articles and methods, the optically active markers 1300 should be inconspicuous relative to the underlying vehicle that the optically active marker is attached to. The optically active marker will typically not communicate any human readable information. However, if the optically active article is the license plate, then the underlying information of the license plate remains.

The optically active markers 1300 communicate machine-readable information to the image capture device 1002. As such, in some examples, only one image of the optically active marker 1300 needs to be taken under a condition that allows the machine-readable information to become visible and detectable.

In some examples, the present application relates to methods and systems for reading an optically active marker 1300. The machine-readable information provided herein may be used to accurately identify a first vehicle 1010.

The retroreflective article chosen for any specific implementation will depend on the desired optical, structural, and durability characteristics. As such, desirable retroreflective articles and materials will vary based on the intended application. Retroreflective articles and materials include reflective and retroreflective substrates. The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting).

Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light.

Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. A seal layer may be applied to the structured surface to keep contaminants away from individual cube corners. Flexible cube corner sheeting can also be incorporated in examples or implementations of the present application. Retroreflective sheeting for use in connection with the present application can be, for example, either matte or glossy.

The retroreflective articles described herein are ordinarily configured to include sheeting that can be applied to a given object or substrate. The articles are generally optically single-sided. That is, one side (designated the front side) is generally adapted to both receive incident light from a source and emit reflected or retroreflected light toward a detector (such as the eye of an observer), and the other side (designated the rear side) is generally adapted for application to an object such as by an adhesive layer. The front side faces the light source as well as the detector. The articles do not generally transmit significant amounts of light from the front side to the rear side, or vice versa, due at least in part to the presence of a substance or layer on the retroreflector such as a vapor coat of metal, a seal film, and/or an adhesion layer.

In one aspect, the present application relates to a retroreflective article comprising a retroreflective substrate and a machine-readable information disposed on at least a portion of the retroreflective substrate.

In another aspect, the present application relates to an optical character recognition process including the steps of providing a set of optically active marker 1300 that are retroreflective substrate comprising machine-readable information, which may including at a code; detecting the machine-readable information and reading the machine-readable information by means of an optical character recognition engine.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

What is claimed is:

1. A system for identifying a first vehicle comprising:
    a set of optically active markers, each optically active marker on at least a portion of opposing outward surfaces of the first vehicle and each optically active marker comprises machine-readable information;
    a image capture device on a second vehicle that detects and produces an image of at least one of the optically active markers;
    a processor that processes the image to find the machine-readable information and associates the machine-readable information with information of the first vehicle,
    wherein the set of optically active markers comprises:
    a first optically active marker on a first outward facing surface of the first vehicle;
    a second optically active marker on a second outward facing surface of the first vehicle, opposite from the first outward facing surface of the first vehicle;
    a third optically active marker on a third outward facing surface of the first vehicle;
    a fourth optically active marker on a fourth outward facing surface of the first vehicle, opposite from the third outward facing surface of the first vehicle.

2. The system of claim 1, wherein at least one optically active marker is a number plate of the first vehicle.

3. The system of claim 1, further comprising an additional optically active marker on the first vehicle.

4. The system of claim 1, wherein the additional optically active marker is on any one of the outward facing surface of the first vehicle.

5. The system of claim 1, wherein at least one optically active marker is retroreflective.

6. The system of claim 1, wherein at least one optically active marker is infrared absorbing, scattering, or reflecting and the image capture device is an infrared camera.

7. The system of claim 1, wherein at least one optically active marker comprises a retroreflective layer and at least a portion comprising an infrared selective layer.

8. The system of claim 1, wherein at least one optically active marker returns polarized light and the image capture device responds to polarized light.

9. The system of claim 1, wherein the optically active markers are visibly transparent or a color corresponding to the outward surface of the vehicle to which it is attached.

10. The system of claim 1, instructions indicate the location on the outward facing surface of the first vehicle for each optically active marker.

11. The system of claim 1, wherein the information regarding the first vehicle include exterior color information, and wherein the optically active markers for attachment to outward facing surfaces of the first vehicle correspond in color to the exterior color information.

12. The system of claim 1, wherein the machine-readable information comprises a code wherein the processor associates machine-readable information of the code with code information.

13. The system of claim 1, wherein the processor accesses a database and associate machine-readable information of the code with code information.

14. The system of claim 1, wherein each optically active marker comprises the same machine-readable information.

15. The system of claim 1, wherein each optically active marker comprises different machine-readable information.

16. The system of claim 1, wherein information about the first vehicle comprises any one of vehicle type, vehicle color, vehicle owner, unique vehicle identification information, vehicle placement.

17. The system of claim 1, wherein the machine-readable information causes the second vehicle to respond.

* * * * *